US008699402B2

(12) United States Patent
Nakagawa et al.

(10) Patent No.: US 8,699,402 B2
(45) Date of Patent: Apr. 15, 2014

(54) MULTI-HOP RELAY RADIO COMMUNICATION SYSTEM, ACCESS GATEWAY, AND ROUTE SELECTION METHOD

(75) Inventors: Hiroto Nakagawa, Tokyo (JP); Koji Watanabe, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 377 days.

(21) Appl. No.: 13/146,824

(22) PCT Filed: Feb. 6, 2009

(86) PCT No.: PCT/JP2009/052106
§ 371 (c)(1),
(2), (4) Date: Sep. 23, 2011

(87) PCT Pub. No.: WO2010/089884
PCT Pub. Date: Aug. 12, 2010

(65) Prior Publication Data
US 2012/0008544 A1    Jan. 12, 2012

(51) Int. Cl.
*H04W 40/12* (2009.01)
*H04W 40/22* (2009.01)

(52) U.S. Cl.
USPC .......................................................... 370/315

(58) Field of Classification Search
None
See application file for complete search history.

(56) References Cited

U.S. PATENT DOCUMENTS

| | | | | |
|---|---|---|---|---|
| 7,016,306 B2* | 3/2006 | Alapuranen et al. | .......... | 370/238 |
| 7,216,282 B2* | 5/2007 | Cain | ............................ | 714/752 |
| 2002/0105691 A1 | 8/2002 | Ichibangase et al. | | |
| 2006/0285505 A1 | 12/2006 | Cho et al. | | |
| 2008/0045139 A1 | 2/2008 | Chen | | |
| 2008/0123584 A1* | 5/2008 | Behrendt et al. | ............... | 370/315 |
| 2009/0219937 A1* | 9/2009 | Liu et al. | ........................ | 370/392 |
| 2011/0164527 A1* | 7/2011 | Mishra et al. | .................. | 370/252 |

FOREIGN PATENT DOCUMENTS

| | | |
|---|---|---|
| JP | 11-027325 | 1/1999 |
| JP | 2000-151634 | 5/2000 |
| JP | 2001-345786 | 12/2001 |
| JP | 2004-153776 | 5/2004 |
| JP | 2006-352894 | 12/2006 |
| JP | 2008-048417 | 2/2008 |

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 8); 3GPP TS 23.401 V.8.2.0 (Jun. 2008); pp. 1-8, 33-44.
PCT International Search Report and Written Opinion on application No. PCT/JP2009/052106 dated May 19, 2009; 7 pages.

* cited by examiner

*Primary Examiner* — Jae Y Lee
*Assistant Examiner* — Alan Lindenbaum
(74) *Attorney, Agent, or Firm* — Foley & Lardner LLP

(57) ABSTRACT

A multi-hop relay wireless communication system provided with an AGW (2), a policy controller (3), a base station (4), one or more relay stations (6), and a mobile station (7) collects data path setting information into the AGW (2) after the establishment of the wireless links between the base station and the relay stations and between the relay stations and the mobile station, selects a relay station (6) which becomes the data path from the one or more relay stations by using the collected information, and sets the optimal path from the AGW (2) to the mobile station (7).

15 Claims, 14 Drawing Sheets

| T31 | T32 |
|------|------|
| MSID | BSID |
| MS7 | BS4 |
| ... | ... |

| MSID | RSID | EDTR | AGW Address |
|---|---|---|---|
| MS7 | RS6-1 | $E_1$ | AGW2 |
|  | RS6-2 | $E_2$ |  |
|  | RS6-3 | $E_3$ |  |
| ... | ... | ... | ... |

T41, T42, T43, T44

| MSID | Route | RSID | EDTR | ART | BS Address |
|------|-------|------|------|-----|------------|
| MS7 | $R_1$ | RS6-1 | $E_1$ | $T_1$ | BS4 |
|  | $R_2$ | RS6-2 | $E_2$ | $T_2$ |  |
|  | $R_3$ | RS6-3 | $E_3$ | $T_3$ |  |
| ... | ... | ... | ... | ... | ... |

T51, T52, T53, T54, T55, T56

| MSID | APLID | QoS | | |
|------|-------|-----|---|---|
|  |  | $W_E$ | $W_T$ | $W_M$ |
| MS7 | A | $W_{EA}$ | $W_{TA}$ | $W_{MA}$ |
|  | B | $W_{EB}$ | $W_{TB}$ | $W_{MB}$ |
|  | ... | ... | ... | ... |
| ... | ... | ... | ... | ... |

T61, T62, T64, T63, T65, T66

| RSID | Policy | Mobility |
|------|--------|----------|
| RS6-1 | $P_1$ | $M_1$ |
| RS6-2 | $P_2$ | $M_2$ |
| RS6-3 | $P_3$ | $M_3$ |
| ... | ... | ... |

T71, T72, T73

| T81 | T82 | T83 QoS | | |
|---|---|---|---|---|
| | | T84 $W_E$ | T85 $W_T$ | T86 $W_M$ |
| MSID | APLID | | | |
| MS7 | A | $W_{EA}$ | $W_{TA}$ | $W_{MA}$ |
| | B | $W_{EB}$ | $W_{TB}$ | $W_{MB}$ |
| | ... | ... | ... | ... |
| ... | ... | ... | ... | ... |

| T91 | T92 | T93 |
|---|---|---|
| RSID | Policy | Mobility |
| RS6-1 | $P_1$ | $M_1$ |
| RS6-2 | $P_2$ | $M_2$ |
| RS6-3 | $P_3$ | $M_3$ |
| ... | ... | ... |

MULTI-HOP RELAY RADIO COMMUNICATION SYSTEM, ACCESS GATEWAY, AND ROUTE SELECTION METHOD

TECHNICAL FIELD

The present invention relates to a multi-hop relay radio communication system, an access gateway, and a route selection method, and more particularly to a multi-hop relay radio communication system including an access gate way, a base station, one or more relay stations, and a mobile station, an access gateway, and a route selection method.

BACKGROUND ART

In recent mobile radio communication system, as systems for realizing a higher-speed radio communication, IMT-Advanced corresponding to a $4^{th}$ generation mobile communication system has been increasingly researched and standardized. In the IMT-Advanced, a maximum transmission rate is set to 100 Mbps in a high-speed mobile environment, and 1 Gbps in a low-speed mobile environment or a fixed environment. The frequency bands in the IMT-Advanced are allocated in World Radio communication Conference 2007 (WRC07), and include 3.5 GHz band in which a bandwidth of 100 MHz is available upstream and downstream. The conventional radio communication system mainly uses frequency bands of 800 MHz band and 2 GHz band. On the contrary, 3.5 GHz band becomes a high frequency, resulting in a risk that a propagation distance of electric waves is shortened. As a result, in the number of existing base stations, there may exist an area at which electric waves of the base stations do not arrive. For example, the area includes an area behind a building and an underground city in urban areas. Also, it is difficult to satisfy the maximum transmission speed of the IMT-Advanced.

As one of methods for solving those problems, a multi-hop relay radio communication system is applied to a cellular phone network. The multi-hop relay radio communication system includes a base station, one or more relay stations, and a mobile station, and conducts radio communication so that the relay station relays electric wave from the base station to the mobile station. This enables a radio communication service to be expanded to the area at which the electric wave of the base station does not arrive. Also, if the multi-hop relay radio communication system is applied in an area subject to weaker radio wave, that is, a cell edge, higher-speed data communication is enabled.

As an important issue when the multi-hop relay radio communication system is applied to the cellular phone network, there is a routing technology. The routing technology means a communication control protocol of route selection for connecting, for example, in an environment where the relay stations (hereinafter referred to as "RSs") are located in correspondence with multi-hop functions, the mobile station (hereinafter referred to as "MS") to a network through the RS and the base station (hereinafter referred to as "BS"), and mobility management. In general, in the cellular phone network, the BS conducts all of controls within a cell. However, in order to select an optimum route from the BS to the MS, there is a need to know radio link quality information between the MS and the peripheral RSs, and a load of an uplink from the MS to the BS becomes enormous.

Patent Literature 1 discloses the routing technology in which the MS receives the radio link quality information of the peripheral RSs, selects an optimum route, and transfers the selected route information to the BS to determine the optimum route. The MS notifies the BS of only information on the optimum RS selected by the MS, thereby suppressing the load of the uplink, and enabling the optimum route setting of the radio link. Also, the normalization of a protocol stack used in the radio communication system is disclosed in, for example, Non Patent Literature 1.

CITATION LISTS

Patent Literature 1: JP-A-2006-352894
Non Patent Literature 1: 3GPP TS23.401v8.2.0 (2008-06) Technical Specification

DISCLOSURE OF THE INVENTION

Problems to be Solved

In the multi-hop relay radio communication system, in order to set a data route between the MS and an access gateway (hereinafter referred to as "AGW") after establishment of the radio link as disclosed in Paten Literature 1, there is required not only the quality of the radio link, but also setting of the data route corresponding to a communication service required by the MS, and a communication service licensed to the MS and the RSs.

In order to solve the above problem, with the help of the access gateway (hereinafter referred to as "AGW") that can acquire, as information for setting the data route, not only the quality of the radio link, but also quality of service (QoS) information corresponding to the communication service licensed to the MS and policy information on the RSs from a policy control and rules function (hereinafter referred to as "PCRF"), or can hold those information as system parameters in advance, the data route needs to be set with the use of the above information. However, there is no disclosure of a method for setting the above data route in the existing multi-hop relay radio communication system.

In view of the above circumstances, one object of the present invention is to provide a multi-hop relay radio communication system in which after radio links between an BS and an RS and between the RS and an MS are established, setting information on data routes are collected in an AGW, an RS serving as the data route is selected from one or more RSs with the use of the setting information on the data route to set an optimum data route from the AGW to the MS.

Also, another object of the present invention is to provide a multi-hop relay radio communication system in which the data route is selected according to policy information indicative of a priority for selecting a relay station of the RS as the data route.

Also, another object of the present invention is to provide a multi-hop relay radio communication system in which the data route is selected taking into consideration an available revenue time of the RS as the setting information on the data route.

Also, another object of the present invention is to provide a multi-hop relay radio communication system in which, in the system using a traveling RS, because it is assumed that the RS travels to frequently reset the route, the data route is selected taking into consideration mobility of the RS as the setting information on the data route.

Also, another object of the present invention is to provide a multi-hop relay radio communication system in which a data route suitable for an application run by the MS is selected.

Solution to Problem

According to the present invention, there is provided the multi-hop relay radio communication system in which the setting information for the data route is collected in the AGW, and the data route is set to select the RS serving as the data route from one or more RSs and set an optimum data route from the AGW to the MS.

There is provided a multi-hop relay radio communication system, comprising:

an MS including a memory part that holds information for identifying an application and information for identifying an RS, a processor part that sets a route to the RS, and an interface that transmits a message to a BS;

at least one RS including a memory part that holds information for identifying the MS and the BS, a processor part that identifies the MS and the RS, and an interface that transmits a message to the BS and the MS;

the BS including a memory part that holds information for identifying the MS and the RS, and radio link quality information between the MS and the BS through the RS, a processor part that identifies the MS and the RS, and an interface that transmits a message to the RS and an AGW;

a PCRF including a memory part that holds QoS information on the MS and policy information on the RS, a processor part that searches the QoS information and the policy information from the memory part, and an interface that transmits a message to the AGW; and the AGW including a memory part that records setting information on a data route for determining the data route, a processor part that selects the data route according to the setting information on the data route, and an interface that transmits a message to the BS and the PCRF, wherein the setting information on the data route for determining an optimum data route is collected in the AGW from the MS, the one or more RSs, the BS, and the PCRF, and the data route is selected by the AGW with the use of the collected setting information on the data route.

Also, in the multi-hop relay radio communication system, the processor part of the AGW acquires the policy information on the RS from the PCRF or the memory part of the AGW as the setting information on the data route for determining the optimum data route, and selects the data route by the processor part of the AGW with the use of the information.

Also, in the multi-hop relay radio communication system, the processor part of the AGW acquires an available revenue time of the RS through the BS as the setting information on the data route for determining the optimum data route, records the available revenue time in the memory part of the AGW, and selects the data route by the processor part of the AGW with the use of the information.

Also, according to the present invention, in the multi-hop relay radio communication system, because it is assumed that the RS travels to frequently reset the route, the processor part of the AGW acquires the mobility of the RS from the PCRF, or sets the mobility in the memory part of the AGW as the setting information on the data route for determining the optimum data route, and selects the data route by the processor part of the AGW with the use of the information.

Also, in the multi-hop relay radio communication system, as a method of selecting the data route suitable for an application run by the MS, that is, the setting information on the data route for determining the optimum data route, the MS notifies the AGW of information indicative of the run application through the RS and the BS, and the processor part of the AGW acquires the QoS information corresponding to the application from the PCRF or the memory part of the AGW on the basis of the information indicative of the run application, and selects the data route with the use of the information.

According to the first solving means of the present invention, there is provided a multi-hop relay radio communication system including a mobile station, one or more relay stations, a base station, and an access gateway, and communicating a control signal and data thereamong, the access gateway comprising an access gateway memory for holding QoS information having a predetermined weight value for setting a route with respect to mobile station identification information (MSID) on the mobile station and application identification information (APLID) on an application run by the mobile station, and for holding relay station information having policy information representative of weights related to use of the respective relay stations with respect to relay station identification information (RSID) of the respective relay stations, wherein the mobile station runs the application and transmits a first setting request of the route, the one or more relay stations transmit a second setting request to the base station according to the first setting request, the base station transmits, to the access gateway, a first message including the mobile station identification information (MSID), the application identification information (APLID) on the application run by the mobile station, the relay station identification information (RSID) on the relay station for each of one or more routes, and an effective data transfer ratio $E_n$ for each of the one or more relay stations, according to the second setting request, wherein the access gateway receives the first message from the base station, records the information included in the first message in the access gateway memory, obtains the QoS information having a weight value $w_E$ for the effective data transfer ratio on the basis of the mobile station identification information (MSID) and the application identification information (APLID), which are set in the received first message, with reference to the access gateway memory, and obtains the relay station information having a policy information $P_n$ representative of the weights related to use of the respective relay stations on the basis of one or more relay station identification information (RSID), selects a route passing through any one of the relay stations on the basis of a plurality of transmission parameters including the effective data transfer ratio $E_n$, the QoS information having the weight value $w_E$, and the relay station information having the policy information $P_n$ according to a relationship among the plurality of transmission parameters, and sets the relay station identification information (RSID) of the relay station in the selected route in association with the mobile station identification information (MSID) in a second message, and transmits the second message to the base station.

According to the second solving means of the present invention, there is provided a access gateway in a multi-hop relay radio communication system including a mobile station, one or more relay stations, a base station, and an access gateway, and communicating a control signal and data thereamong, the access gateway comprising an access gateway memory for holding QoS information having a predetermined weight value for setting a route with respect to mobile station identification information (MSID) on the mobile station and application identification information (APLID) on an application run by the mobile station, and for holding relay station information having policy information representative of weights related to use of the respective relay stations with respect to relay station identification information (RSID) of the respective relay stations, wherein the mobile station receives, from the base station, a first message including the mobile station identification information (MSID), the application identification information (APLID) of the application run by the mobile station, the relay station identification information on the relay station for each of one or more routes and effective data transfer ratios $E_n$ of the one or more relay stations, which are transmitted from the base station through the one or more relay stations, according to the start of the application by the mobile station to transmit a setting request for the route, records the information included in the first message in the access gateway memory, obtains the QoS information having a weight value $w_E$ for the effective data transfer ratio on the basis of the mobile station identification information (MSID) and the application identification information (APLID), which are set in the received first message, with reference to the access gateway memory, and obtains the relay station information having a policy information $P_n$ representative of the weights related to use of the respective relay stations on the basis of one or more relay station identification information (RSID), selects a route passing through any one of the relay stations on the basis of a plurality of transmission parameters including the effective data transfer ratio $E_n$, the QoS information having the weight value $w_E$, and the relay station information having the policy information $P_n$ according to a relationship among the plurality of transmission parameters, and sets the relay station identification information (RSID) of the relay station in the selected route in association with the mobile station identification information (MSID) in a second message, and transmits the second message to the base station.

According to the third solving means of the present invention, there is provided a route selection method in a multi-hop relay radio communication system including a mobile station, one or more relay stations, a base station, and an access gateway, and communicating a control signal and data thereamong, the access gateway comprising an access gateway memory for holding QoS information having a predetermined weight value for setting a route with respect to mobile station identification information (MSID) on the mobile station and application identification information (APLID) on an application run by the mobile station, and for holding relay station information having policy information representative of weights related to use of the respective relay stations with respect to relay station identification information (RSID) of the respective relay stations, wherein the mobile station runs the application and transmits a first setting request of the route, the one or more relay stations transmit a second setting request to the base station according to the first setting request, the base station transmits, to the access gateway, a first message including the mobile station identification information (MSID), the application identification information (APLID) on the application run by the mobile station, the relay station identification information (RSID) on the relay station for each of one or more routes, and an effective data transfer ratio $E_n$ for each of the one or more relay stations, according to the second setting request, wherein the access gateway receives the first message from the base station, records the information included in the first message in the access gateway memory, obtains the QoS information having a weight value $w_E$ for the effective data transfer ratio on the basis of the mobile station identification information (MSID) and the application identification information (APLID), which are set in the received first message, with reference to the access gateway memory, and obtains the relay station information having a policy information $P_n$ representative of the weights related to use of the respective relay stations on the basis of one or more relay station identification information (RSID), selects a route passing through any one of the relay stations on the basis of a plurality of transmission parameters including the effective data transfer ratio $E_n$, the QoS information having the weight value $w_E$, and the relay station information having the policy information $P_n$ according to a relationship among the plurality of transmission parameters, and sets the relay station identification information (RSID) of the relay station in the selected route in association with the mobile station identification information (MSID) in a second message, and transmits the second message to the base station.

Advantageous Effect of Invention

According to the present invention, in the multi-hop relay radio communication system, the setting information on the data route for determining the data route between the MS and the AGW according to a communication service required by the mobile station or a communication service licensed to the mobile station and the relay station is collected in the AGW, and the AGW sets the data route. As a result, the route corresponding to the communication service required by the MS and the communication service licensed to the MS and the RS can be set with the use of not only the radio link quality information but also the policy information on the RS, the available revenue time of the RS, the mobility of the RS, and the QoS information required by the MS.

Also, according to the present invention, in the multi-hop relay radio communication system, the data route taking the policy information on the RS into consideration is selected, thereby enabling the setting of the route taking into consideration whether data transfer is enabled, or not, and the priority of the RS to be selected, for example, from a plurality of candidate RSs.

Also, according to the present invention, in the multi-hop relay radio communication system, the data route taking the available revenue time of the RS into consideration is selected as the setting information on the data route for determining the optimum data route. As a result, for example, in the case where the RS operates with a battery, communication can be prevented from being interrupted immediately when the battery runs out, or the route can be prevented from being reset when the battery runs out, and stable communication is enabled.

Also, according to the present invention, in the multi-hop relay radio communication system, because it is assumed that the RS travels to frequently reset the route, the stable data route is selected taking into consideration the mobility of the RS as the setting information on the data route for determining the data route between the MS and the AGW according to the mobility of the relay station. As a result, a trend to travel the RS is grasped, and for example, communication can be prevented from being interrupted immediately, and the route can be prevented from being reset, thereby enabling stable communication.

Also, according to the present invention, in the multi-hop relay radio communication system, as a method of selecting the data route suitable for the application run by the MS, that is, the setting information on the data route for determining the data route between the MS and the AGW according to the communication service required by the mobile station, the optimum data route is selected on the basis of the QoS information. As a result, for example, when VoIP requiring a real time quality is conducted, even if throughput of data is small, the data route can be set prioritizing that the connection of communication is not interrupted.

DESCRIPTION OF EMBODIMENTS

This embodiment provides an AGW and a routing method which establish radio links between a BS and each RS and between each RS and an MS, and an optimum data route is set according to a plurality of candidate RSs, in a multi-hop relay radio communication system.

1. System

[An Example of Architecture of a Multi-Hop Relay Radio Communication System According to This Embodiment]

Figure 1:
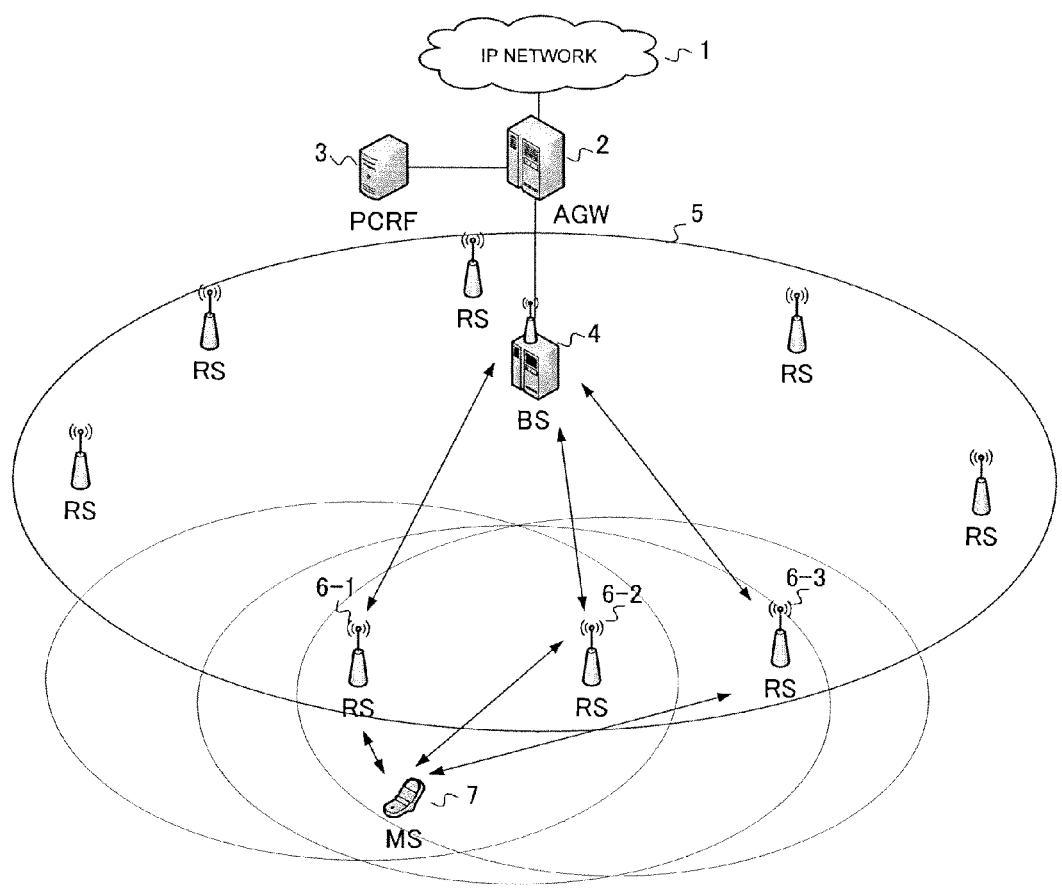
FIG. 1 illustrates an example of a multi-hop relay radio communication system according to this embodiment.

FIG. 1 illustrates an example of a multi-hop relay radio communication system according to this embodiment. An access gateway (AGW) 2 is connected to an IP network, and communicates control signals and data with another AGW, another base station (BS), and another communication system. The AGW 2 is connected to a policy control and rules function (PCRF) 3, and exchanges the control signals with the PCRF 3 for the purpose of acquiring QoS information indicative of information on a communication quality corresponding to an application required by a mobile station (MS), policy information indicative of priority for selecting relay stations (RSs) as a data route, and/or RS information including mobility of the RSs. A BS 4 covers a base station communication coverage 4, is connected with the AGW 2, an RS 6, and an MS 7, and exchanges the control signals and data with those components. In FIG. 1, it is assumed that the MS 7 establishes radio links with an RS 6-1, an RS 6-2, and an RS 6-3, for example, as disclosed in Patent Literature 1. Also, FIG. 1 illustrates that the MS 7 is situated out of the base station communication coverage 5. However, the following description is also applied to a case in which the MS 7 is situated within the base station communication coverage 5.

[An Example of a Call Flow for Setting a Data Route According to this Embodiment]

Figure 2:
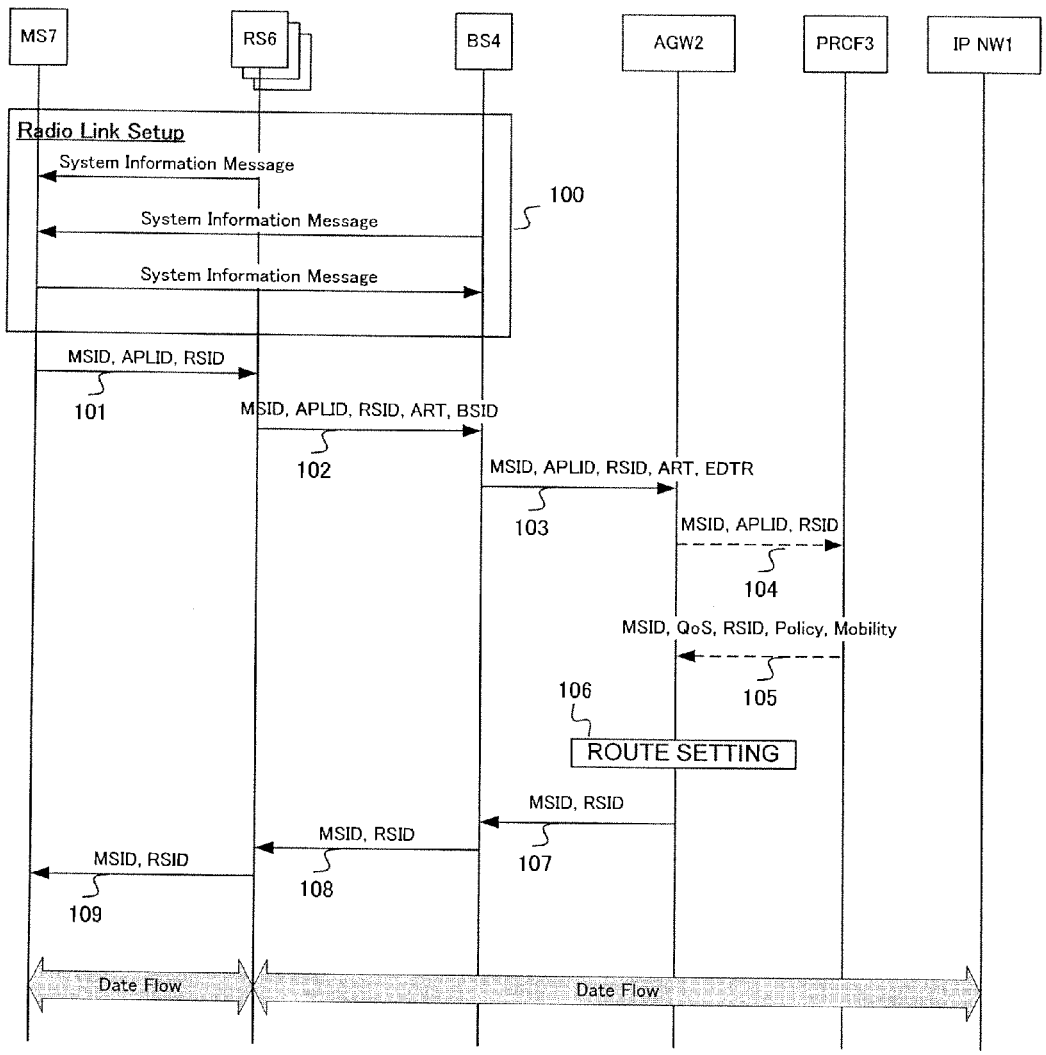
FIG. 2 illustrates an example of a call flow for setting a data route according to this embodiment.

FIG. 2 illustrates an example of a call flow for setting a data route according to the present invention. An example of a message format in FIG. 2 will be described with reference to FIGS. 8 to 15.

In Step 100, a radio link setup is conducted, for example, in a method of Patent Literature 1. In this situation, it is assumed that the MS 7 and the BS 4 hold an identifier (hereinafter referred to as "RSID") of at least one RS 6 that establishes the radio link. Also, an example of information held by the MS 7 will be described with reference to FIG. 3B. It is assumed that the RS 6 holds an identifier (hereinafter referred to as "MSID") of the MS and an identifier (hereinafter referred to as "BSID") of the BS, which establish the radio link. An example of information held by the RS 6 will be described with reference to FIG. 4B. It is assumed that the BS 4 holds an effective data transfer ratio (hereinafter referred to as "EDTR") between the BS 4 and the MS 7 through at least one RS 6. An example of information held by the BS 4 will be described with reference to FIG. 5B.

In order to run an application and request establishment of the data route, the MS 7 transmits a message 101 including an identifier (hereinafter referred to as "APLID") of an application to be run according to the identifier MSID of the MS 7 per se, at least one held RSID, and correspondence information of the application held by the MS 7 and an identifier of the application. An example of the correspondence information of the application held by the MS 7 and the identifier thereof will be described with reference to FIG. 3C.

If the RSID set in a received message 101 matches the RSID of the RS 6 per se, the RS 6 associates the MSID with the BS connected to the MS through the RS according to information held in the RS. Then, the RS 6 sets the MSID and APLID set in the received message 101, the identifier RSID of the RS 6 per se, and information (hereinafter referred to as "ART" (available revenue time)) indicative of a communication enable time of the RS in a message 102, and transmits the message 102 to the BS 4.

The BS 4 associates the MSID and RSID set in the received message 102 with the effective transfer ratio between the MS and the BS through the RS, and the AGW to be connected according to information held by the BS 4. Then, the BS 4 sets the MSID, the APLID, the RSID, the ART, and the EDTR set in the received message 102 in a message 103, and transmits the message 103 to the AGW 2.

The AGW 2 creates a correspondence table for managing setting information of the data route set in the received message 103. In order to acquire the QoS information required for the MS 7, and the policy information and the mobility of the RS 6, the AGW 2 sets the MSID, the RSID, and the APLID in a message 104, and transmits the message 104 to the PCRF 3. In this situation, the QoS information required for the MS 7, the policy information and the mobility of the RS 6 can be set in the AGW 2. The message 104 can be omitted (refer to FIGS. 6C and 6D). An example of the correspondence table for managing the setting information of the data route created by the AGW 2 will be described with reference to FIGS. 6B, 6C, and 6D.

The PCRF 3 associates the MSID and the APLID set in the received message 104 with the required QoS according to the QoS information held by the PCRF 3. The PCRF 3 also associates the RSID set in the received message 104 with the policy information (Policy) and the mobility (Mobility) of the RS according to the RS information held by the PCRF 3. Then, the PCRF 3 sets the MSID, the APLID, and the RSID set in the received message 104, and the QoS, the Policy, and the Mobility in a message 105, and transmits the message 105 to the AGW 2. The information in FIGS. 7B and 7C can be set in the AGW 2. An example of the QoS information held by the PCRF 3 will be described with reference to FIG. 7B. Also, an example of the RS information held by the PCRF 3 will be described with reference to FIG. 7C.

The AGW 2 determines the RS through a route setting process 106. An example of processing of the route setting process 106 will be described in detail with reference to a flowchart of FIG. 6E which will be described later. The AGW 2 sets the identifier RSID of the selected RS 6 and, the held MSID received in the message 103 in a message 107, and transmits the message 107 to the BS 4.

The BS 4 recognizes that the message 107 is a reply to the message 103 according to the MSID set in the received message 107, and also sets a data route to the RS selected from the RSID set in the received message 107. Then, the BS 4 transmits the MSID and the RSID set in the received message 107 to the RS 6 held in FIG. 5B.

The RS 6 recognizes that the message 107 is a reply to the message 102 according to the MSID set in a received message 108, and also recognizes whether the subject RS 6 is selected for the data route, or not, according to the RSID set in the received message 108. The selected RS 6 sets the MSID set in the received message 108 and the subject RSID selected for the data route in a message 109, and transmits the message 109 to the MS 7. The unselected RS 6 may not transmit the message 109.

The MS 7 recognizes that the message 109 is a reply to the message 101 according to the MSID set in the received message 109, and also recognizes the selected RS according to the RSID set in the received message 109. Then, the MS 7 sets a data route with the selected RS 6.

2. MS

[M of the Present Invention [An Example of Configuration of MS According to this Embodiment]

Figures 3A, 3B, 3C:
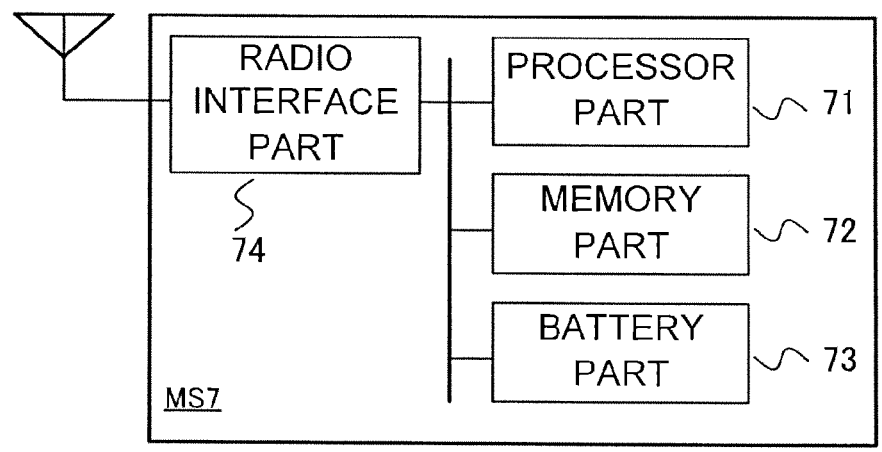
FIG. 3A illustrates an example of a mobile station according to this embodiment.
FIG. 3B illustrates an example of information recorded in a memory part of the mobile station according to this embodiment.
FIG. 3C illustrates an example of information recorded in the memory part of the mobile station according to this embodiment.

FIG. 3A illustrates an example of a functional block diagram of the MS used in this embodiment.

The MS 7 includes a processor part 71, a memory part 72, a battery part 73, and a radio interface part 74. The radio interface part (radio-IF) 74 transmits and receives an IP packet between the BS and the RS. The memory part 72 holds the IP packet to be transmitted and received, application information, information on a battery level, and management information such as correspondence between the BSID and the RSID. The processor part 71 conducts an IP packet transmission and reception process such as management of information held in the memory part 72, and the creation and analysis of the IP packet. The battery part 73 is equipped with a battery of the RS.

[An Example of Information Held by a Memory Part of MS According to this Embodiment]

FIG. 3B illustrates an example of information (table 1) held by the memory part of the MS according to this embodiment. T11 (RSID) is an identifier of the RS having the radio link established. T12 (BSID) is an identifier of the BS having the radio link established with the RS indicated by T11.

FIG. 3C illustrates an example of information (table 2) held by the memory part of the MS. T21 (APL Type) is the type of applications held by the MS. T22 (APLID) is an identifier of the application.

[An Example of Processing by a Processor Part of MS According to this Embodiment]

Figure 3D:
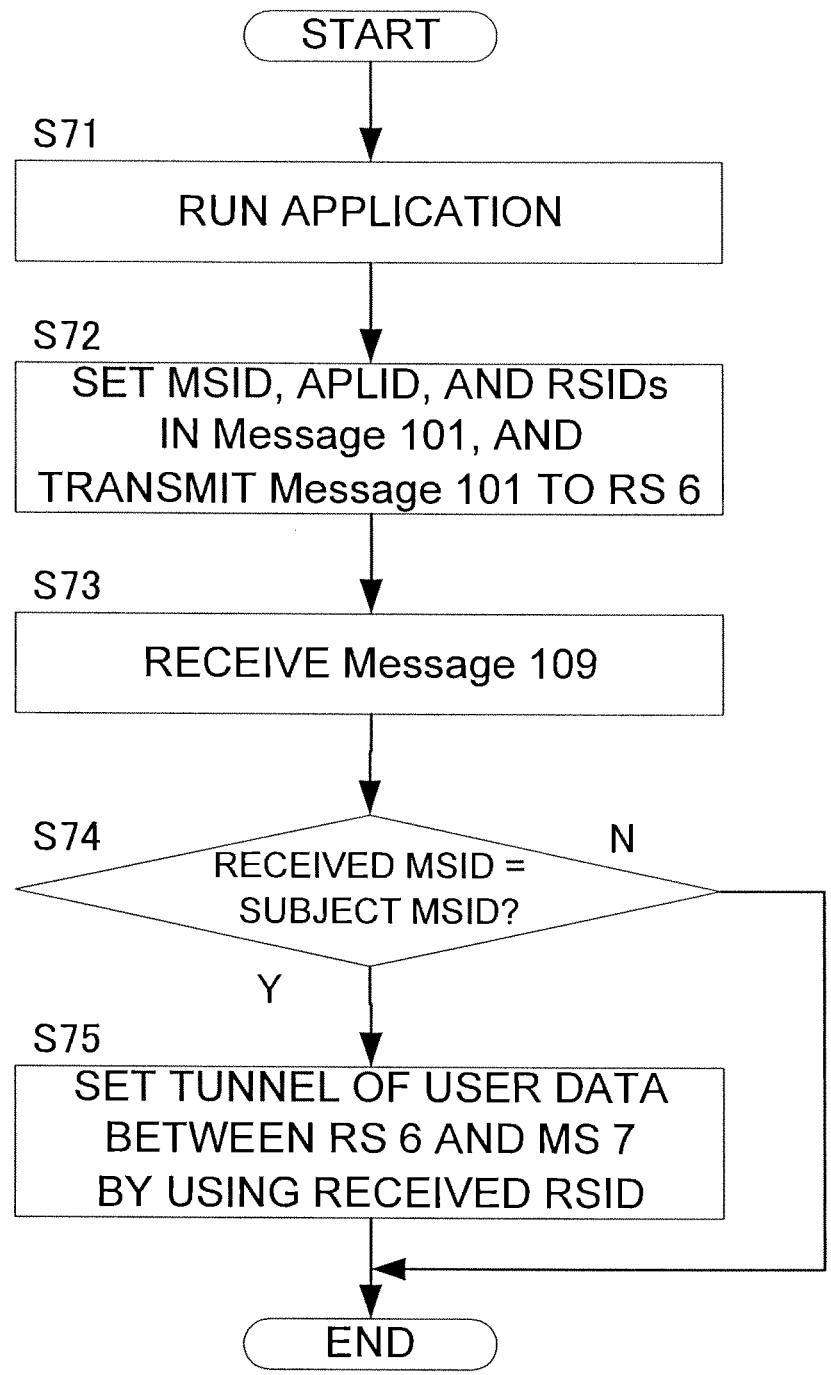
FIG. 3D illustrates an example of processing by a processor part of the mobile station according to this embodiment.

FIG. 3D is a flowchart illustrating an example of processing by the processor part of the MS according to this embodiment.

In Step S71, the processing part 71 runs an application for some communication service. Then, in Step S72, the processor part 71 sets a value of the identifier APLID of the application corresponding to the application run in S71 in a message 101 on the basis of the MSID of the subject MS, one or more RSIDs held in the memory part of the MS, and the table 2 illustrated in FIG. 3C, which is held in the memory part of the MS. Then, the processor part 71 transmits the message 101 to one or more RSs on the basis of the table 1 illustrated in FIG. 3B.

On the other hand, in Step S73, the processor part 71 receives the message 109 through the radio interface part 74. Then, in Step S74, the processor part 71 determines whether the MSID set in the received message 109 matches the MSID of the subject MS, or not. If yes, the processor part 71 conducts the processing of Step S75. If no, the processor part 71 discards the message 109. If the determination is yes in Step S74, the processor part 71 sets a tunnel of user data between the MS and the RS with the use of the RSID received in S73, in Step S75.

3. RS

[An Example of Configuration of RS According to this Embodiment]

Figures 4A, 4B:
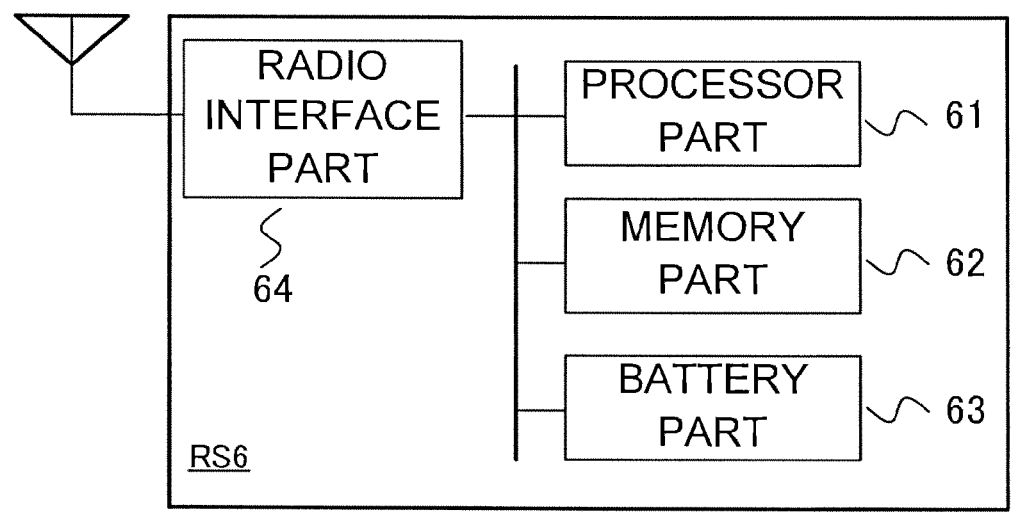
FIG. 4A illustrates an example of a relay station according to this embodiment.
FIG. 4B illustrates an example of information recorded in a memory part of the relay station according to this embodiment.

FIG. 4A illustrates an example of a functional block diagram of the RS used in this embodiment.

The RS 6 includes a processor part 61, a memory part 62, a battery part 63, and a radio interface part 64. The radio interface part (radio-IF) 64 transmits and receives the IP packet between the RS and the MS. The memory part 62 holds the IP packet to be transmitted and received, the radio link quality information, and information on a battery level, and management information such as correspondence between the BSID and the MSID. The processor part 61 conducts an IP packet transmission and reception process such as management of information held in the memory part 62, and the creation and analysis of the IP packet. The battery part 63 is equipped with a battery of the RS.

[An Example of Information Held in a Memory Part of RS According to this Embodiment]

FIG. 4B illustrates an example of information (table 3) held by the memory part of the RS according to this embodiment. T31 (MSID) is an identifier of the MS having a radio link established. T32 (BSID) is an identifier of the BS having the radio link established.

[An Example of Processing of a Processor Part According to this Embodiment]

Figure 4C:
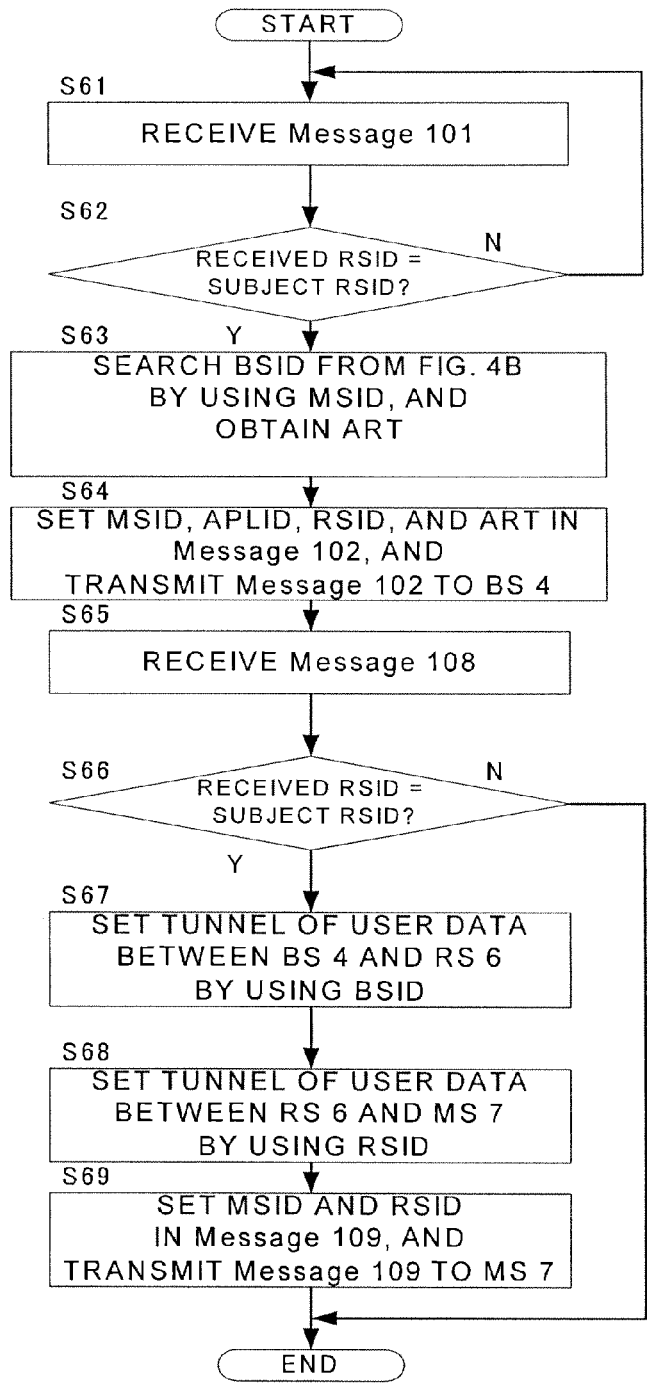
FIG. 4C illustrates an example of processing by a processor part of the relay station according to this embodiment.

FIG. 4C is a flowchart illustrating an example of processing by the processor part of the RS according to this embodiment.

In Step S61, the processor part 61 receives the message 101 through the radio interface part 64. Then, in Step S62, the processor part 61 determines whether the RSID set in the received message 101 matches the RSID of the subject RS, or not. If yes, the processor part 61 conducts the processing of Step S63. If no, the processor part 61 discards the received message 101. If the determination is yes in Step S62, the processor part 61 searches the BSID according to the correspondence information of the MSID and the BSID on the basis of the MSID set in the received message 101, for example, on the basis of the table 3 illustrated in FIG. 4B, which is held in the memory part of the BS, in Step S63. Also, the processor part 61 determines a value Tn of an available revenue time (ART) indicative of a communication enable time of the subject RS according to a given technique or a given set value. For example, if the available revenue time is set from the battery level, the value of Tn can be determined according to the battery level of the battery part 63. Also, for example, when an operator of the RS intends to limit the use of the RS within a given time as a use time of the RS, the value of Tn can be determined according to the given time.

In Step S64, the processor part 61 sets, in the message 102, MSID and APLID set in the received message 101, the RSID of the subject RS, the BSID acquired in Step S63, and the value Tn of the ART (available revenue time) indicative of the communication enable time of the subject RS. Then, the processor part 61 transmits the message 102 to the BS 6 according to the BSID.

On the other hand, in Step S65, the processor part 61 receives the message 108 through the radio interface part 64. Then, in Step S66, the processor part 61 determines whether the RSID set in the received message 108 matches the RSID of the subject RS, or not. If yes, the processor part 61 conducts the processing of Step S67. If no, the processor part 61 discards the message 108. If the determination is yes in Step S66, the processor part 61 searches the BSID corresponding to the MSID set in the received message 108 from FIG. 4B, and sets a tunnel of user data between the BS and the RS with the use of the searched BSID in Step S67. In Step S68, the processor part 61 sets a tunnel of user data between the RS and the MS with the use of the RSID of the subject RS. Then, in Step S69, the processor part 61 sets the MSID set in the received message 108 and the RSID of the subject RS in the message 109, and transmits the message 109 to the MS 7 through the radio interface part 64.

4. BS

[An Example of Configuration of BS According to this Embodiment]

Figures 5A, 5B:
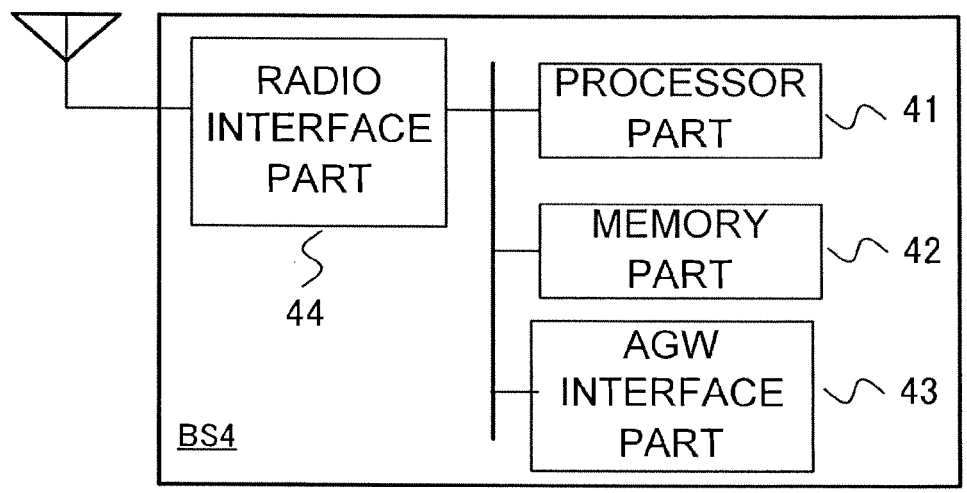
FIG. 5A illustrates an example of a base station according to this embodiment.
FIG. 5B illustrates an example of information recorded in a memory part of the base station according to this embodiment.

FIG. 5A illustrates an example of a functional block diagram of the BS used in this embodiment.

The BS 4 includes a processor part 41, a memory part 42, an AGW interface part 43, and a radio interface part (radio-IF) 44. The AGW interface part (AGW-IF) 43 is an interface with the AGW. The AGW-IF 43 transmits and receives the IP packet with respect to the AGW 2. The radio interface part 44 transmits and receives the IP packet with respect to the RS and the MS. The memory part 42 holds the IP packet to be transmitted and received, the radio link quality information, and management information such as correspondence of the address of the AGW to be connected with the MSID and the RSID. The processor part 41 conducts an IP packet transmission and reception process such as management of information held in the memory part 42, and the creation and analysis of the IP packet.

[An Example of Information Held by a Memory Part of BS According to this Embodiment]

FIG. 5B illustrates an example of information (table 4) held in the memory part of the BS according to this embodiment. T41 (MSID) is an identifier of the MS. T42 (RSID) is an identifier of the RS. T43 (EDTR) is an effective data transfer ratio between the MS and the BS through the RS. The effective data transfer ratio may be obtained by a given method in which, for example, the effective data transfer ratio is statistically obtained from a past communication state, or may be set in advance. T44 (AGW address) is an address of the AGW to be connected.

[An Example of Processing by a Processor Part of BS According to this Embodiment]

Figure 5C:
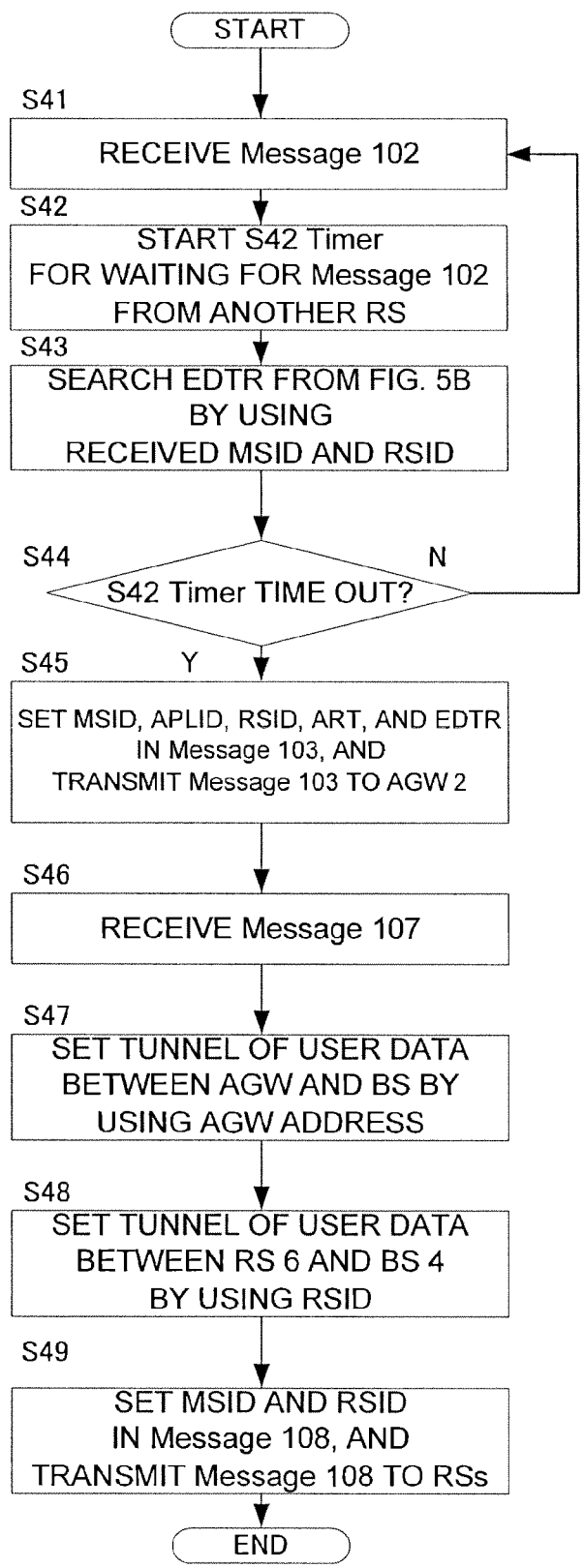
FIG. 5C illustrates an example of processing by a processor part of the base station according to this embodiment.

FIG. 5C is a flowchart illustrating an example of processing by the processor part of the BS according to this embodiment.

In Step S41, the processor part 41 receives the message 102 through the radio interface part 44. Then, in Step S42, the processor part 41 starts a timer (S42 Timer) for waiting reception of the message 102 from another RS for a given time. The timer is initialized every time receiving the message 102. In Step S43, the processor part 41 searches a value of an effective data transfer ratio EDTR corresponding to the MSID and the RSID set in the received message 102 from the table 4 illustrated in FIG. 5B which is held by the memory part of the BS. In Step S44, the processor part 41 conducts the processing of Step S45 when the timer started in Step S42 expires. When receiving the message 102, the processor part 41 further conducts the processing of Steps S42 and S43. In Step S45, the processor part 41 sets the MSID, the APLID, the RSID, and the ART set in the received message 102, and the EDTR obtained in Step S43 in the message 103, and transmits the message 103 to the AGW. In this situation, when receiving a plurality of messages 102, the processor part 41 sets plural sets of RSIDs, ARTs, and EDTRs corresponding to the MSID in one message 103, from the table 4 illustrated in FIG. 5B held in the memory part 42 of the BS 4.

On the other hand, in Step S46, the processor part 41 receives the message 107. Then, in Step S47, the processor part 41 recognizes that the message 107 is a reply to the message 103 according to the MSID, the RSID, and the AGW address set in the received message 107 on the basis of the table 4 illustrated in FIG. 5B, which is held by the memory part 42 of the BS 4. Then, the processor part 41 sets a tunnel of user data between the AGW and the ES with the use of the AGW address. In Step S48, the processor part 41 sets a tunnel of user data with the use of the RSID set in the message 107 received in S46.

In Step S49, the processor part 41 sets the MSID and the RSID set in the message 107 received in Step S46 in the message 108, and transmits the message 108 to the RS 6.

5. AGW

[An Example of Configuration of AGW According to this Embodiment]

Figures 6A, 6B, 6C, 6D:
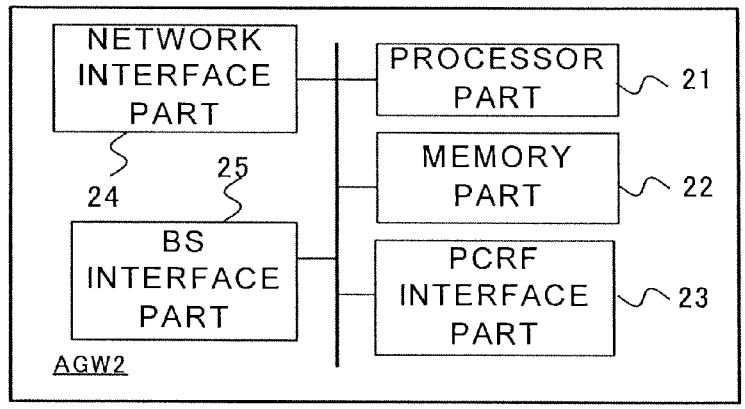
FIG. 6A illustrates an example of an access gateway according to this embodiment.
FIG. 6B illustrates an example of information recorded in a memory part of the access gateway according to this embodiment.
FIG. 6C illustrates an example of information recorded in the memory part of the access gateway according to this embodiment.
FIG. 6D illustrates an example of information recorded in the memory part of the access gateway according to this embodiment.

FIG. 6A illustrates an example of a functional block diagram of the AGW used in this embodiment.

The AGW 2 includes a processor part 21, a memory part 22, a PCRF interface part (PCRF-IF) 23, a network interface part (NW-IF) 24, and a BS interface part (BS-IF) 25. The NW-IF 24 transmits and receives the IP packet with respect to an IP network 1, another AGW, and another radio system. The BS-IF 25 is an interface with the BS. The BS-IF 25 transmits and receives the IP packet with respect to the BS 4 and another BS. The PCRF-IF 23 is an interface with the PCRF. The PCRF-IF 23 transmits and receives the IP packet with respect to the PCRF 3. The memory part 22 holds the IP packet to be transmitted and received, the radio link quality information, the QoS information, the policy information, and management information such as correspondence of the addresses of the PCRF and the BS to be connected with the MSID and the RSID. The processor part 21 conducts an IP packet transmission and reception process such as management of information held in the memory part 22, and the creation and analysis of the IP packet.

[An Example of Information Held by a Memory Part of AGW According to this Embodiment]

FIG. 6B illustrates an example of information (table 5) held by the memory part of the AGW according to this embodiment. T51 (MSID) is an identifier of the MS. T52 (route) is a route index of each route which will be described later. T53 (RSID) is an identifier of the RS. T54 (EDTR) is an effective data transfer ratio between the MS and the BS through the RS received from the BS. T55 (ART) is a remaining available revenue time of the RS received from the BS. T56 (BS address) is an address of the BS connected with the AGW.

FIG. 6C illustrates an example of information (table 6) held by the memory part of the AGW according to this embodiment. T61 (MSID) is an identifier of the MS. A T62 (APLID) is an identifier of the application. T63 (QoS) is a weight value to the setting information on the data route corresponding to the application, which is used for calculation of Expression 1. T64 ($W_E$) is a weight value to the effective data transfer ratio EDTR, T65 ($W_T$) is a weight value to the available revenue time ART of the RS, and T66 ($W_M$) is a weight value to the mobility of the RS. The values of T64 ($W_E$), T65 ($W_T$), and T66 ($W_M$) are used to determine the priority of the setting information on the data route corresponding to the application.

FIG. 6D illustrates an example of information (table 7) held in the memory part of the AGW according to this embodiment. T71 (MSID) is an identifier of the MS. T72 (Policy) is policy information (information representative of a weight related to the use of the relay station) of the RS. For example, in the RS possessed by police or fire department, the priority of the RS is normally set to be lower, thereby enabling the RS to be prevented from being selected as the data route of a third party. Also, for example, in the RS provided with an incentive to serve as the data route of the third party, and/or the RS favorably or positively serving as the data route of the third party, the priority can be set to be higher. T73 (Mobility) is the mobility of the RS (for example, information representative of the degree of travel of the relay station, distinction of travel or fixation, or the type of relay station). To T73 is set a value, for example, indicating whether the form of the RS is fixed, nomadic, portable, or mobile. The mobility can be appropriately set to a high value or a low value according to the design or specification of the network or system, or a client request.

The table illustrated in FIG. 6C and/or FIG. 6D may be held in the AGW 2, and alternatively the AGW 2 may appropriately receive information from the PCRF 3 as necessary, without provision of any one or both of those tables.

[An Example of Processing by a Processor Part of AGW According to this Embodiment]

Figure 6E:
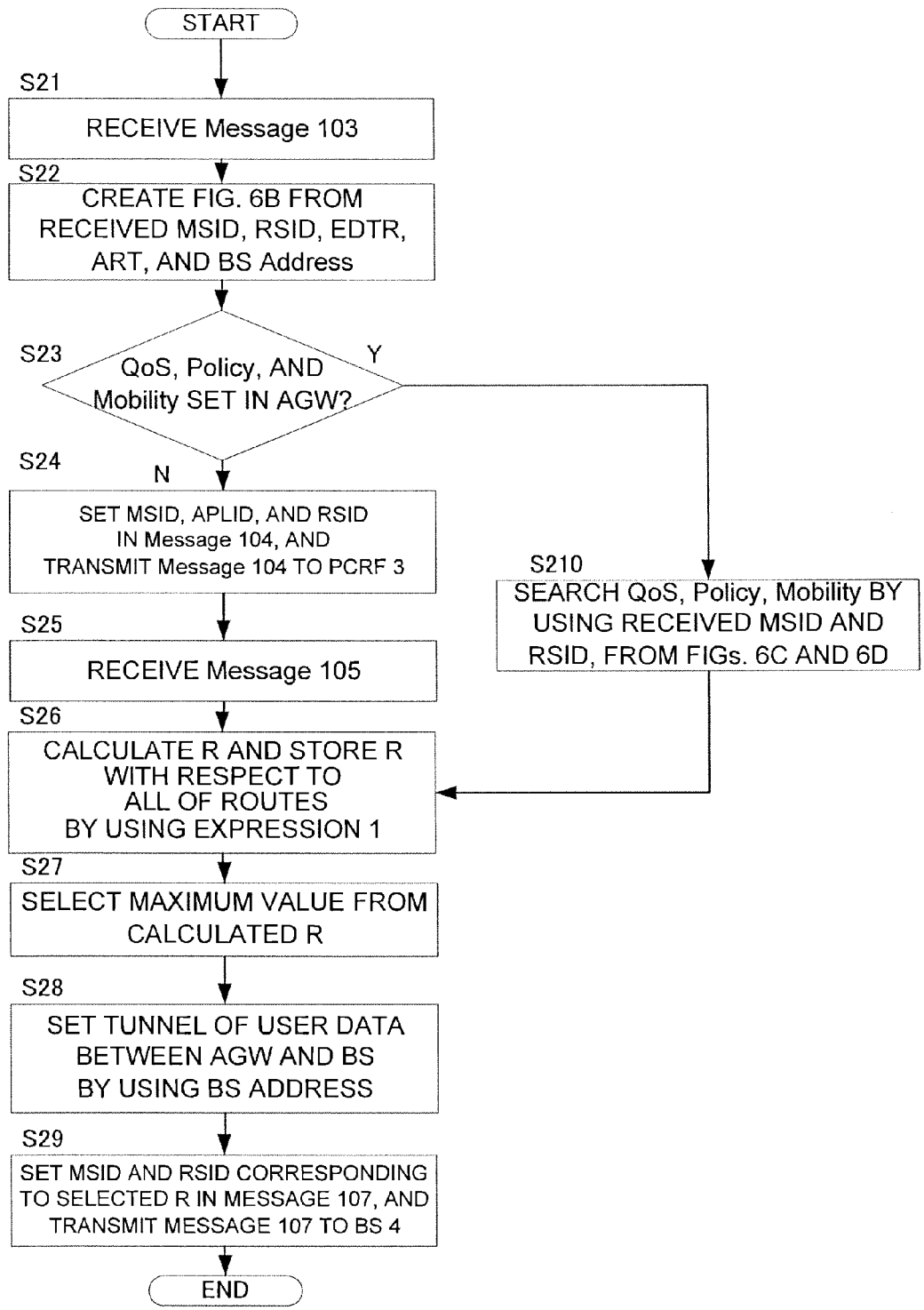
FIG. 6E illustrates an example of processing by a processor part of the access gateway according to this embodiment.

FIG. 6E is a flowchart illustrating an example of processing by the processor part of the AGW according to this embodiment.

In Step S21, the processor part 21 receives the message 103. Then, in Step S22, the processor part 21 creates the table 5 illustrated in FIG. 6B for managing the setting information on the data route set in the received message 103, and records the table 5 in the memory part 22 of the AGW 2. The setting information on the data route is intended to calculate a route index $R_n$ for each route, for example, in the table 5 of FIG. 6B, and can include a value $E_r$, of the EDTR and a value $T_n$ of the ART.

In Step S23, the processor part 21 determines whether the QoS information and the RS information are set in the memory part 22 of the AGW 2, or not, on the basis of the MSID, the APLID, and the RSID set in the received message 103. The QoS information is intended to calculate the route index $R_n$ in FIG. 6B, for example, in the table 6 of FIG. 6C, and can include a weight value $W_E$ for the EDTR, a weight value $N_T$ for the ART, and a weight value $W_M$ for the mobility, which are corresponding to the APLID. The RS information is intended to calculate the route index $R_n$ in FIG. 6B, for example, in the table 7 shown in FIG. 6D, and can include a value $P_n$ indicative of the policy information on the RS and/or a value $M_n$ indicative of the mobility of the RS.

When the QoS information and the RS information are not set in the memory part 22 of the AGW, the processor part 21 sets the MSID, the APLID, and the RSID received in the message 103, in the message 104 in Step S24, and transmits the message 104 to the PCRF. In Step S25, the processor part 21 receives the message 105, which is a response message to the message 104, from the PCRF. In this situation, the processor part 21 records the QoS information and the RS information set in the received message 105 in the memory part 22 (tables 6 and 7) of the AGW.

On the other hand, in Step S23, when the QoS information and the RS information are set in the memory part 22 of the AGW, that is, when information in the table 6 of FIG. 6C and the table 7 of FIG. 6D is held, the processor part 21 searches the QoS information and the RS information on the basis of the MSID, the APLID, and the RSID received in the message 103, in Step S210.

In Step S26, the processor part 21 calculates the route index $R_n$ for each route (index n) through the following expression, with the use of the setting information on the data route in the table 5 illustrated in FIG. 6B, which is created in S22, and the QoS information (table 6) and the RS information (table 7), which are acquired in S25 and S210, respectively.

$$R_n = P_n(w_E E_n + w_T T_n + w_M M_n)$$

(where
n is the index of the route,
$R_n$ is the index of the effective route, $P_n$ is the policy information indicative of the priority for selecting the relay station as the data route (weight related to the use of the relay station) in which the priority can be raised by increasing the value, $E_n$ is the effective data transfer ratio, $T_n$ is the available revenue time of the relay station, $M_n$ is the mobility of the relay station, $W_E$ is the weight value depending on the QoS with respect to the $E_n$, $W_T$ is the weight value depending on the QoS with respect to the $T_n$, and $W_M$ is the weight value depending on the QoS with respect to the $M_n$.)

The $T_n$ can be omitted if the available revenue time is not set in the relay station, and the $M_n$ can be omitted if the relay station does not travel.

In those cases, the processor part 21 can calculate the route index $R_n$ with the use of any one of the following expressions.

$$R_n = P_n(w_E E_n + w_M M_n)$$

$$R_n = P_n(w_E E_n + w_T T_n)$$

$$R_n = P_n w_E E_n$$

The processor part 21 stores the calculated route index Rn in T52 (Route) of the table 5 illustrated in FIG. 6B.

Then, in Step S27, the processor part 21 reads the route index $R_n$ for each route from the table 5, and selects a maximum value of the index $R_n$ of the effective route calculated in Step S26. In Step S28, the processor part 21 associates the route $R_n$ selected in Step S27 with the BS address (BS Address) on the basis of the table 5 illustrated in FIG. 6B, and sets a tunnel of user data between the AGW and the BS with the use of the associated BS address. In Step S29, the processor part 21 associates the route $R_n$ selected in S27 with the MSID and the RSID on the basis of the table 5 illustrated in FIG. 6B, sets the MSID and the RSID in the message 107, and transmits the message 107 to the BS.

Hereinafter, an example of the processor part 21 of the AGW 2 will be described in detail. In this example, in FIGS. 6B and 7B, route information related to the RS 6-1 used in Expression 1 is $P_1=1$, $E_1=3$, $T_1=2$, and $M_1=4$. Route information related to the RS 6-2 used in Expression 1 is $P_2=1$, $E_2=4$, $T_2=2$, and $M_2=3$. Route information related to the RS 6-3 used in Expression 1 is $P_3=0$, $E_3=3$, $T_3=0$, and $M_3=3$. $P_3=0$ indicates that selection of the RS 6-3 as the data route is not permitted.

Figures 7A, 7B, 7C:
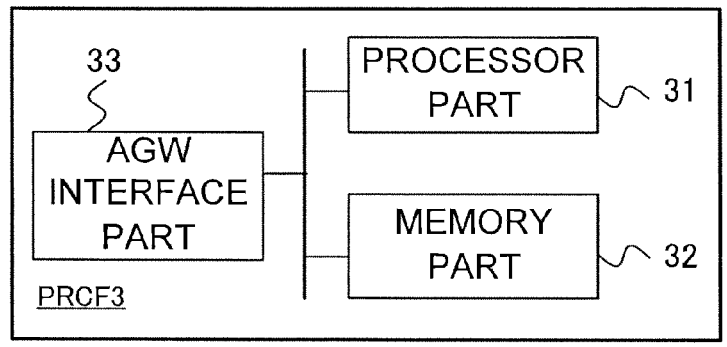
FIG. 7A illustrates an example of a PCRF according to this embodiment.
FIG. 7B illustrates an example of information recorded in a memory part of the PCRF according to this embodiment.
FIG. 7C illustrates an example of information recorded in the memory part of the PCRF according to this embodiment.

If a non-real-time quality is required for the application required by the MS 7, for example, when the APL Type of FIG. 3C is Mail, the APLID becomes A from FIG. 6C or 7B. If the respective weight values depending on the QoS are set to $w_{EA}=2$, $w_{TA}=1$, and $w_{MA}=1$, calculation results of $R_1=12$, $R_2=13$, and $R_3=0$ are obtained in S26, and R2 that is the maximum value is selected in S27.

Thus, if the non-real-time quality is required for the application required by the MS 7, the processor part 21 of the AGW 2 can calculate the index $R_n$ of the effective route with the use of the weight value $w_{EB}$ for the effective data transfer ratio which is larger than the weight value $w_{MB}$ for the mobility and the weight value $w_{TB}$ for the available revenue time of the relay station.

Also, if a real time quality is required for the application required by the MS, for example, when the APL Type of FIG. 3C is VoIP, the APLID becomes B from FIG. 6C or 7B. If the respective weight values depending on the QoS are set to $w_{EB}=1$, $w_{TB}=1$, and $w_{MB}=2$, calculation results of $R_1=13$, $R_2=12$, and $R_3=0$ are obtained in S26, and R1 that is the maximum value is selected in S27.

Thus, if the real time quality is required for the application required by the MS 7, the processor part 21 of the AGW 2 can calculate the index $R_n$ of the effective route with the use of the weight value $w_{MA}$ for the mobility which is larger than the weight value $w_{EA}$ for the effective data transfer ratio and the weight value $w_{TA}$ for the available revenue time of the relay station.

As described in the above example, the RS can be selected according to the QoS information corresponding to the communication quality required for the application, and the policy information indicative of the priority for selecting the RS as the data route.

6. PCRF

[An Example of Configuration of PCRF According to this Embodiment]

FIG. 7A illustrates an example of a functional block diagram of the PCRF used in this embodiment.

The PCRF 3 includes a processor part 31, a memory part 32, and an AGW interface part 33. The AGW interface part (AGW-IF) 33 is an interface with the AGW 2. The AGW-IF 33 transmits and receives the IP packet with respect to the AGW 2. The memory part 32 holds the IP packet to be transmitted and received, battery information, mobility information, QoS information, policy information, and management information such as correspondence of the address of the AGW to be connected with the MSID and the RSID. The processor part 31 conducts an IP packet transmission and reception process such as management of information held in the memory part 32, and the creation and analysis of the IP packet.

[An Example of Information Held by a Memory Part of PCRF According to This Embodiment]

FIG. 7B illustrates an example of information (table 8) held by the memory part of the PCRF according to this embodiment. The table 8 is identical with the table 6. T81 (MSID) is an identifier of the MS. T82 (APLID) is an identifier of the application. T83 (QoS) is a weight value for the setting information on the data route corresponding to the application used in calculation of Expression 1. T84 ($W_E$) is a weight value for the effective data transfer ratio EDTR. T85 ($W_T$) is a weight value for the available revenue time ART of the RS, and T86 ($W_M$) is a weight value for the mobility of the RS. The values of T84 ($W_E$), T85 ($W_T$), and T86 ($W_M$) are used to determine the priority of the setting information on the data route corresponding to the application.

FIG. 7C illustrates an example of information (table 9) held in the memory part of the PCRF according to this embodiment. The table 9 is identical with the table 7. T91 (MSID) is an identifier of the MS. T92 (Policy) is policy information of the RS. T93 (Mobility) is the mobility of the RS.

The table 8 in FIG. 7B and the table 9 in FIG. 7C can be set in the AGW. Also, in this case, the PCRF 3 may not be provided with the tables 8 and 9.

[An Example of Processing by a Processor Part of PCRF According to this Embodiment]

Figure 7D:
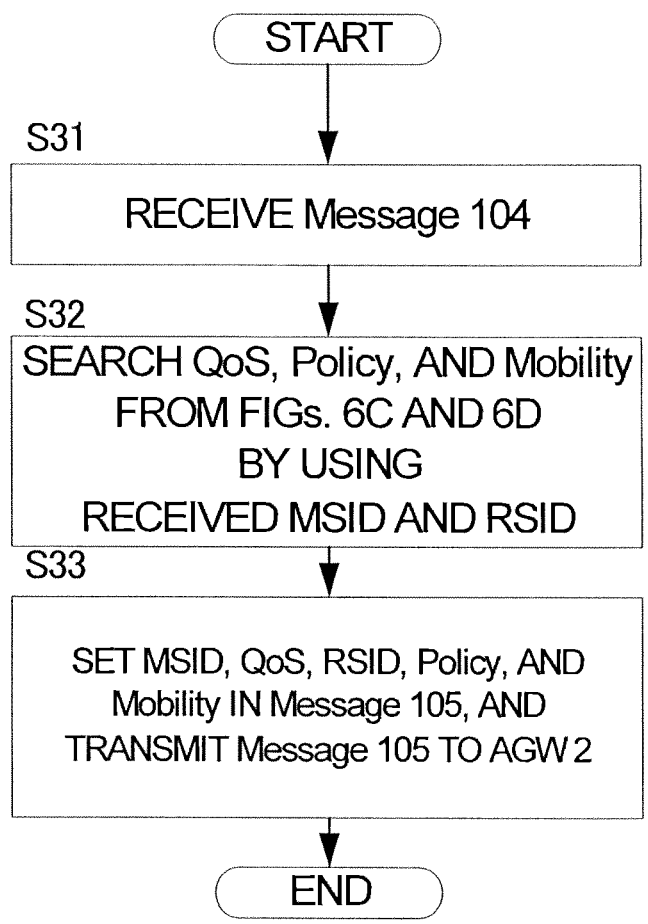
FIG. 7D illustrates an example of processing by a processor part of the PCRF according to this embodiment.

FIG. 7D is a flowchart illustrating an example of processing by the processor part of the PCRF according to this embodiment.

In Step S31, the processor part 31 receives the message 104. Then, in Step S32, the processor part 31 searches the QoS information corresponding to the MSID and the APLID set in the received message 104, and the RS information corresponding to the RSID according to the table 8 illustrated in FIG. 7B and the table 9 illustrated in FIG. 7C, which are held in the memory part 32 of the PCRF 3. In Step S33, the processor part 31 sets the MSID set in the received message 104, the QoS information, the RSID, and the RS information in the message 105, and transmits the message 105 to the AGW.

7. Message Format

[An Example of Message Format According to this Embodiment: MS→RS]

Figure 8:
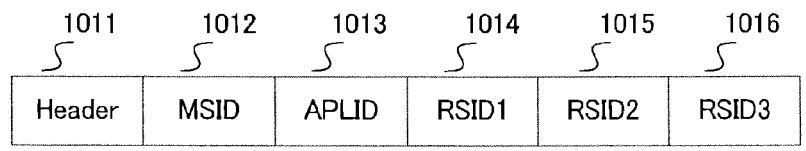
FIG. 8 illustrates an example of a message format according to this embodiment.

FIG. 8 illustrates an example of a format of the message 101 to be transmitted from the MS 7 to the RS 6. A Header 1011 stores information on L1, MAC (Medium Access Control), RLC (Radio Link Control), PDCP (Packet Data Convergence Protocol), and IP (Internet Protocol), which are disclosed in FIG. 5.1.1.3-1 of Non Patent Literature 1, therein. An MSID field 1012 and an APLID field 1013 are configured by a TLV format illustrated in FIG. 15. The MSID and the application information are set in a Value field 203. A Type field 201 is indicative of the type of information stored in the Value field 203, and a Length field 202 is indicative of a length of the Value field 203. The figure illustrates an example including RSID 1 to RSID 3. However, the number of RSIDs is not limited to this, but may be arbitrary.

[An Example of a Message Format According to this Embodiment: RS→BS]

Figure 9:
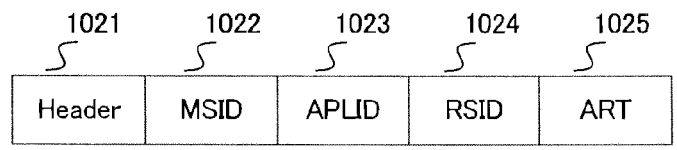
FIG. 9 illustrates an example of the message format according to this embodiment.

FIG. 9 illustrates an example of a format of the message 102 to be transmitted from the RS 6 to the BS 4. A Header 1021 stores information on L1, MAC (Medium Access Control), RLC (Radio Link Control), PDCP (Packet Data Convergence Protocol), and IP (Internet Protocol), which are disclosed in FIG. 5.1.1.3-1 of Non Patent Literature 1, therein. What are received by the message 101 are copied into an MSID field 1022 and an APLID field 1023. An RSID field 1024 and an ART field 1025 are configured by the TLV format illustrated in FIG. 15. The RSID and the ART are set in the Value field 203. The Type field 201 is indicative of the type of information stored in the Value field 203, and the Length field 202 is indicative of a length of the Value field 203.

[An Example of a Message Format According to this Embodiment: BS→AGW]

Figure 10:
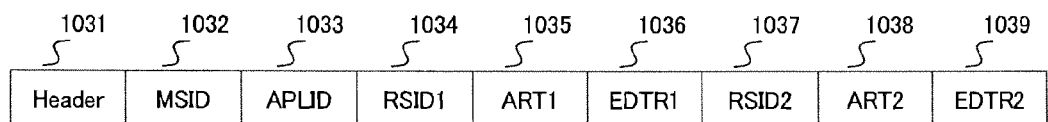
FIG. 10 illustrates an example of the message format according to this embodiment.

FIG. 10 illustrates an example of a format of the message 103 to be transmitted from the BS 4 to the AGW 2. A Header 1031 stores information on L1, L2, and IP (Internet Protocol), which are disclosed in FIG. 5.1.1.2-1 of Non Patent Literature 1, therein. What are received by the message 102 are copied into an MSID field 1032, an APLID field 1033, an RSID field 1034, and an ART field 1035. When receiving the message 102 from a plurality of candidate RSs, the BS 4 sets an RSID field 1036 and an ART field 1037 by the number of the received message 102, that is, by the number of RSs. An EDTR field 1038 is configured by the TLV format illustrated in FIG. 15, and the radio link information held by the BS 4 is set in the Value field 203. The Type field 201 is indicative of the type of information stored in the Value field 203, and the Length field 202 is indicative of a length of the Value field 203. The figure illustrates an example including two sets of RSIDs, ARTs, and EDTRs. However, the number of sets is not limited to this, but can be arbitrary.

[An Example of a Message Format According to this Embodiment: AGW→PCRF]

Figure 11:
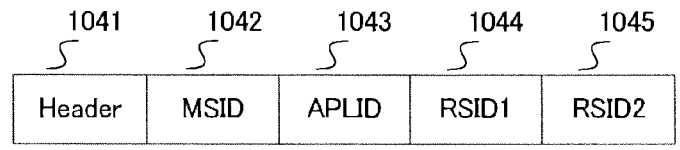
FIG. 11 illustrates an example of the message format according to this embodiment.

FIG. 11 illustrates an example of a format of the message 104 to be transmitted from the AGW 2 to the PCRF 3. A Header 1041 stores information on L1, L2, and IP (Internet Protocol), which are disclosed in FIG. 5.1.1.2-1 of Non Patent Literature 1, therein. An MSID field 1042, an APLID field 1043, an RSID 1044, and an RSID 1045 are configured by the TLV format illustrated in FIG. 15, and what are received by the message 103 are copied into the Value field 203. When a plurality of RSID fields are set in the message 103, a field is added like the RSID 1045. The Type field 201 is indicative of the type of information stored in the Value field 203, and the Length field 202 is indicative of a length of the Value field 203. The figure illustrates an example including data of the RSID1 and the RSID2. However, the number of RSIDs is not limited to this, but can be arbitrary.

[An Example of a Message Format According to this Embodiment: PCRF→AGW]

Figure 12:
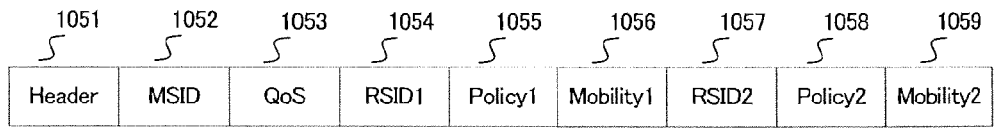
FIG. 12 illustrates an example of the message format according to this embodiment.

FIG. 12 illustrates an example of a format of the message 105 to be transmitted from the PCRF 3 to the AGW 2. A Header 1051 stores information on L1, L2, and IP (Internet Protocol), which are disclosed in FIG. 5.1.1.2-1 of Non Patent Literature 1, therein. What are received by the message 104 are copied into an MSID field 1052 and an RSID field 1054. A QoS field 1053, a Policy field 1055, and a Mobility field 1056 are configured by the TLV format illustrated in FIG. 15. The QoS information corresponding to the application information of the MS 7, the policy information of the RS 6, and the mobility information of the RS 6, which are held by the PCRF, are set in the respective Value fields 203. When a plurality of RSID fields are set in the message 104, fields are added like an RSID field 1057, a Policy field 1058, and a Mobility field 1059. The Type field 201 is indicative of the type of information stored in the Value field 203, and the Length field 202 is indicative of a length of the Value field 203. The figure illustrates an example including two sets of RSIDs, Policy, and Mobility. However, the number of sets is not limited to this, but can be arbitrary.

[An Example of a Message Format According to this Embodiment: AGW→BS]

Figure 13:
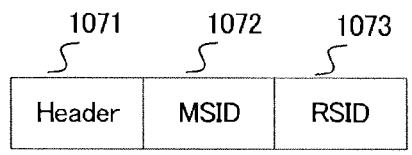
FIG. 13 illustrates an example of the message format according to this embodiment.

FIG. 13 illustrates an example of a format of the message 107 to be transmitted from the AGW 2 to the BS 4. A Header 1011 stores information on L1, L2, and IP (Internet Protocol), which are disclosed in FIG. 5.1.1.2-1 of Non Patent Literature 1, therein. An MSID field 1072 and an RSID field 1073 are configured by the TLV format illustrated in FIG. 15. The MSID and the RSID selected by the AGW 2 are set in the Value field 203. The Type field 201 is indicative of the type of information stored in the Value field 203, and the Length field 202 is indicative of a length of the Value field 203.

[An Example of a Message Format According to this Embodiment: BS→RS, RS→MS]

Figure 14:
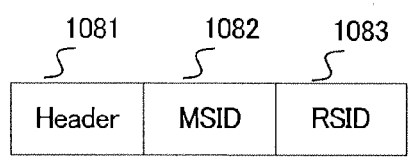
FIG. 14 illustrates an example of the message format according to this embodiment.
Figure 15:
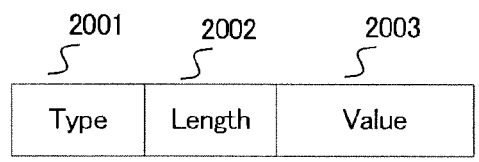
FIG. 15 illustrates an example of the message format according to this embodiment.

FIG. 14 illustrates an example of a format of the message 108 and the message 109 to be transmitted from the BS 4 to the RS 6 and from the RS 6 to the MS 7. A Header 1081 stores information on L1, MAC (Medium Access Control), RLC (Radio Link Control), PDCP (Packet Data Convergence Protocol), and IP (Internet Protocol), which are disclosed in FIG. 5.1.1.3-1 of Non Patent Literature 1, therein. An MSID field 1082 and an RSID field 1083 are configured by the TLV format illustrated in FIG. 15. The MSID and the RSID are set in the Value field 203. The Type field 201 is indicative of the type of information stored in the Value field 203, and the Length field 202 is indicative of a length of the Value field 203.

The invention claimed is:

1. A multi-hop relay radio communication system including a mobile station, one or more relay stations, a base station, and an access gateway, and communicating a control signal and data thereamong, the access gateway comprising an access gateway memory for holding QoS information having a predetermined weight value for setting a route with respect to mobile station identification information (MSID) on the mobile station and application identification information (APLID) on an application run by the mobile station, and for holding relay station information having policy information representative of weights related to use of the respective relay stations with respect to relay station identification information (RSID) of the respective relay stations, wherein the mobile station runs the application and transmits a first setting request of the route, the one or more relay stations transmit a second setting request to the base station according to the first setting request, the base station transmits, to the access gateway, a first message including the mobile station identification information (MSID), the application identification information (APLID) on the application run by the mobile station, the relay station identification information (RSID) on the relay station for each of one or more routes, and an effective data transfer ratio $E_n$ for each of the one or more relay stations, according to the second setting request, wherein the access gateway receives the first message from the base station, records the information included in the first message in the access gateway memory, obtains the QoS information having a weight value $w_E$ for the effective data transfer ratio on the basis of the mobile station identification information (MSID) and the application identification information (APLID), which are set in the received first message, with reference to the access gateway memory, and obtains the relay station information having a policy information $P_n$ representative of the weights related to use of the respective relay stations on the basis of one or more relay station identification information (RSID), selects a route passing through any one of the relay stations on the basis of a plurality of transmission parameters including the effective data transfer ratio $E_n$, the QoS information having the weight value $w_E$, and the relay station information having the policy information $P_n$ according to a relationship among the plurality of transmission parameters, and sets the relay station identification information (RSID) of the relay station in the selected route in association with the mobile station identification information (MSID) in a second message, and transmits the second message to the base station.

2. The multi-hop relay radio communication system according to claim 1, wherein the access gateway calculates a route index $R_n$ of a route passing through each of the relay stations through the following expression, and obtains the relay station identification information (RSID) on the relay station according to a magnitude of the route index $R_n$ to select the route:

$R_n = P_n w_E E_n$ where n is an index of the route, $P_n$ is the policy information indicative of the priority for selecting the relay station as a data route, $E_n$ is the effective data transfer ratio, and $W_E$ is the weight value depending on the QoS with respect to the $E_n$.

3. The multi-hop relay radio communication system according to claim 1, wherein the first message further includes an available time for communication $T_n$ of the relay station for the respective relay stations, the QoS information further includes a weight value $w_T$ for the available time for communication of the relay station, and/or a weight value $w_M$ for the mobility of the relay station, the relay station information further includes a mobility Mn representative of the degree of travel of the respective relay stations or distinction of travel or fixation, and wherein the access gateway calculates a route index $R_n$ of a route passing through each of the relay stations through the following expression, and obtains the relay station identification information (RSID) on the relay station according to a magnitude of the route index $R_n$ to select the route:

$R_n = P_n(w_E E_n + w_M M_n)$ $R_n = P_n(w_E E_n + w_T T_n)$ $R_n = P_n(w_E E_n + w_T T_n + w_M M_n)$ where n is an index of the route, $P_n$ is the policy information indicative of the priority for selecting the relay station as a data route, $E_n$ is the effective data transfer ratio, $T_n$ is the available time for communication of the relay station, $M_n$ is the mobility of the relay station, $W_E$ is the weight value depending on the QoS with respect to the $E_n$, $W_T$ is the weight value depending on the QoS with respect to the $T_n$, and $W_M$ is the weight value depending on the QoS with respect to the $M_n$.

4. The multi-hop relay radio communication system according to claim 3, wherein, when a real time quality is required for an application required by the mobile station, the index $R_n$ of an effective route is calculated with use of the weight value $w_M$ for the mobility which is larger than the weight value $w_E$ for the effective data transfer rate and the weight value $w_T$ for the available time for communication of the relay station.

5. The multi-hop relay radio communication system according to claim 3, wherein when a non-real-time quality is required for an application required by the mobile station, the index $R_n$ of an effective route is calculated with use of the weight value $w_E$ for the effective data transfer ratio which is larger than the weight value $w_M$ for the mobility and the weight value $w_T$ for the available time for communication of the relay station.

6. The multi-hop relay radio communication system according to claim 1, further comprising: a policy control device having a policy memory that holds the QoS information having a given weight value for setting the route with respect to the mobile station identification information (MSID) of the mobile station and the application identification information (APLID), and holds the relay station information having the policy information representative of a weight related to use of the respective relay stations with respect to the relay station identification information (RSID) of the respective relay stations, wherein, when the QoS information and/or the relay station information is not set in the access gateway memory, the access gateway sets the mobile station identification information (MSID), the application identification information (APLID), and the relay station identification information (RSID), which are received in the first message, in a third message, and transmits the third message to the policy control device, the policy control device obtains the QoS information and the relay station information from the policy memory on the basis of the third message, sets the obtained information in a fourth message, and transmits the fourth message to the access gateway, and upon receiving the fourth message, the access gateway selects a route passing through any one of the relay stations with use of the QoS information and the relay station information which are set in the fourth message, and/or records the route in the access gateway memory.

7. The multi-hop relay radio communication system according to claim 1, the base station comprising a base station memory that holds the effective data transfer ratios $E_n$ in the respective relay stations in correspondence with the mobile station identification information (MSID) and the one or more relay station identification information (RSID), wherein the base station obtains the effective data transfer ratio $E_n$ for each of the routes passing through the one or more relay stations, sets, in the first message, information including the mobile station identification information (MSID), the application identification information (APLID), the one or more relay station identification information (RSID), an available time for communication of the respective relay stations received from the respective relay stations, and the effective data transfer ratios $E_n$ of the respective relay stations, and transmits the first message to the access gateway.

8. A access gateway in a multi-hop relay radio communication system including a mobile station, one or more relay stations, a base station, and an access gateway, and communicating a control signal and data thereamong, the access gateway comprising an access gateway memory for holding QoS information having a predetermined weight value for setting a route with respect to mobile station identification information (MSID) on the mobile station and application identification information (APLID) on an application run by the mobile station, and for holding relay station information having policy information representative of weights related to use of the respective relay stations with respect to relay station identification information (RSID) of the respective relay stations, wherein the mobile station receives, from the base station, a first message including the mobile station identification information (MSID), the application identification information (APLID) of the application run by the mobile station, the relay station identification information on the relay station for each of one or more routes and effective data transfer ratios $E_n$ of the one or more relay stations, which are transmitted from the base station through the one or more relay stations, according to the start of the application by the mobile station to transmit a setting request for the route, records the information included in the first message in the access gateway memory, obtains the QoS information having a weight value $w_E$ for the effective data transfer ratio on the basis of the mobile station identification information (MSID) and the application identification information (APLID), which are set in the received first message, with reference to the access gateway memory, and obtains the relay station information having a policy information $P_n$ representative of the weights related to use of the respective relay stations on the basis of one or more relay station identification information (RSID), selects a route passing through any one of the relay stations on the basis of a plurality of transmission parameters including the effective data transfer ratio $E_n$, the QoS information having the weight value $w_E$, and the relay station information having the policy information $P_n$ according to a relationship among the plurality of transmission parameters, and sets the relay station identification information (RSID) of the relay station in the selected route in association with the mobile station identification information (MSID) in a second message, and transmits the second message to the base station.

9. The access gateway according to claim 8, wherein the access gateway calculates a route index $R_n$ of a route passing through each of the relay stations through the following expression, and obtains the relay station identification information (RSID) on the relay station according to a magnitude of the route index $R_n$ to select the route:

$$R_n = P_n w_E E_n$$

where n is an index of the route, $P_n$ is the policy information indicative of the priority for selecting the relay station as a data route, $E_n$ is the effective data transfer ratio, and $W_E$ is the weight value depending on the QoS with respect to the $E_n$.

10. The access gateway according to claim 8, wherein the first message further includes an available time for communication $T_n$ of the relay station for the respective relay stations, the QoS information further includes a weight value $w_T$ for the available time for communication of the relay station, and/or a weight value $w_M$ for the mobility of the relay station, the relay station information further includes a mobility Mn representative of the degree of travel of the respective relay stations or distinction of travel or fixation, and wherein the access gateway calculates a route index $R_n$ of a route passing through each of the relay stations through the following expression, and obtains the relay station identification information (RSID) on the relay station according to a magnitude of the route index $R_n$ to select the route.

11. The access gateway according to claim 10, wherein, when a real time quality is required for an application required by the mobile station, the index $R_n$ of an effective route is calculated with use of the weight value $w_M$ for the mobility which is larger than the weight value $w_E$ for the effective data transfer rate and the weight value $w_T$ for the available time for communication of the relay station.

12. The access gateway according to claim 10, wherein when a non-real-time quality is required for an application required by the mobile station, the index $R_n$ of an effective route is calculated with use of the weight value $w_E$ for the effective data transfer ratio which is larger than the weight value $w_M$ for the mobility and the weight value $w_T$ for the available time for communication of the relay station.

13. A route selection method in a multi-hop relay radio communication system including a mobile station, one or more relay stations, a base station, and an access gateway, and communicating a control signal and data thereamong, the access gateway comprising an access gateway memory for holding QoS information having a predetermined weight value for setting a route with respect to mobile station identification information (MSID) on the mobile station and application identification information (APLID) on an application run by the mobile station, and for holding relay station information having policy information representative of weights related to use of the respective relay stations with respect to relay station identification information (RSID) of the respective relay stations, wherein the mobile station runs the application and transmits a first setting request of the route, the one or more relay stations transmit a second setting request to the base station according to the first setting request, the base station transmits, to the access gateway, a first message including the mobile station identification information (MSID), the application identification information (APLID) on the application run by the mobile station, the relay station identification information (RSID) on the relay station for each of one or more routes, and an effective data transfer ratio $E_n$ for each of the one or more relay stations, according to the second setting request, wherein the access gateway receives the first message from the base station, records the information included in the first message in the access gateway memory, obtains the QoS information having a weight value $w_E$ for the effective data transfer ratio on the basis of the mobile station identification information (MSID) and the application identification information (APLID), which are set in the received first message, with reference to the access gateway memory, and obtains the relay station information having a policy information $P_n$ representative of the weights related to use of the respective relay stations on the basis of one or more relay station identification information (RSID), selects a route passing through any one of the relay stations on the basis of a plurality of transmission parameters including the effective data transfer ratio $E_n$, the QoS information having the weight value $w_E$, and the relay station information having the policy information $P_n$ according to a relationship among the plurality of transmission parameters, and sets the relay station identification information (RSID) of the relay station in the selected route in association with the mobile station identification information (MSID) in a second message, and transmits the second message to the base station.

14. The route selection method according to claim 13, wherein the access gateway calculates a route index $R_n$ of a route passing through each of the relay stations through the following expression, and obtains the relay station identification information (RSID) on the relay station according to a magnitude of the route index $R_n$ to select the route:

$$R_n = P_n w_E E_n$$

where n is an index of the route, $P_n$ is the policy information indicative of the priority for selecting the relay station as a data route, $E_n$ is the effective data transfer ratio, and $W_E$ is the weight value depending on the QoS with respect to the $E_n$.

15. The route selection method according to claim 13, wherein the first message further includes an available time for communication $T_n$ of the relay station for the respective relay stations, the QoS information further includes a weight value $w_T$ for the available time for communication of the relay station, and/or a weight value $w_M$ for the mobility of the relay station, the relay station information further includes a mobility Mn representative of the degree of travel of the respective relay stations or distinction of travel or fixation, and wherein the access gateway calculates a route index $R_n$ of a route passing through each of the relay stations through the following expression, and obtains the relay station identification information (RSID) on the relay station according to a magnitude of the route index $R_n$ to select the route:

$$R_n = P_n(w_E E_n + w_M M_n)$$

$$R_n = P_n(w_E E_n + w_T T_n)$$

$$R_n = P_n(w_E E_n + w_T T_n + w_M M_n)$$

where n is an index of the route, $P_n$ is the policy information indicative of the priority for selecting the relay station as a data route, $E_n$ is the effective data transfer ratio, $T_n$ is the available time for communication of the relay station, $M_n$ is the mobility of the relay station, $W_E$ is the weight value depending on the QoS with respect to the $E_n$, $W_T$ is the weight value depending on the QoS with respect to the $T_n$, and $W_M$ is the weight value depending on the QoS with respect to the $M_n$.

* * * * *